Patented Mar. 7, 1939

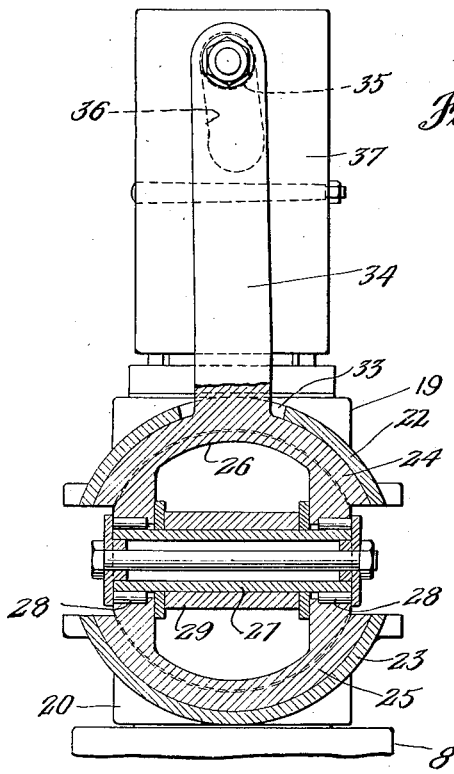
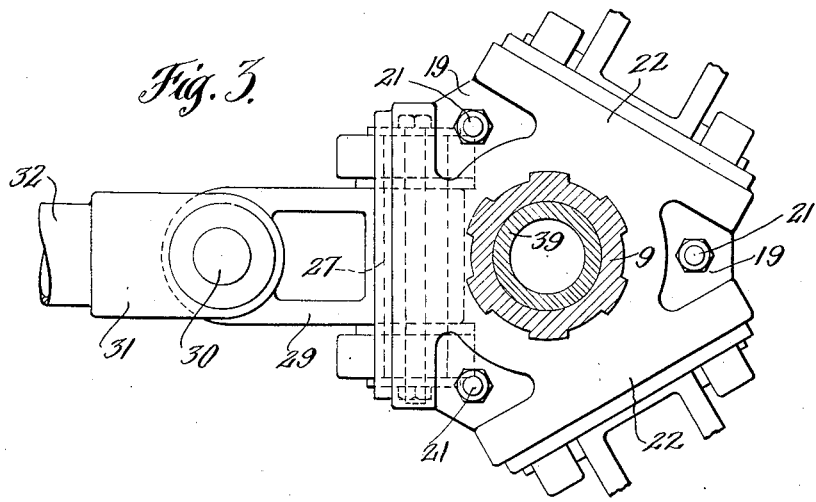

2,150,129

UNITED STATES PATENT OFFICE 2,150,129

AIRCRAFT WITH ROTATIVE WINGS

Joseph S. Pecker, Philadelphia, Pa., assignor, by mesne assignments, to Autogiro Company of America, a corporation of Delaware Application January 29, 1937, Serial No. 122,921

3 Claims. (Cl. 244—18)

This invention relates to aircraft with rotative wings, and especially aircraft of the type having a normally autorotationally actuable sustaining rotor, and the invention is more particularly concerned with a rotor head structure incorporating a hub, mounting means therefor, and means for mounting the rotor blades on the hub.

In rotors of this type it is customary to employ a plurality of blades or wings articulated to the rotative hub member on an axis or axes at least including a "flapping axis" about which the blade is free to swing under the influence of flight forces to compensate for differential lift. Structures providing for change in blade pitch have also been employed, see for example copending application of Juan de la Cierva, Serial No. 738,349, filed August 3, 1934, for the purpose of providing jump or direct take-off of the craft from the ground. Generally stated, this type of take-off is achieved by driving the rotor while the craft is on the ground and with the blade pitch at or near zero lift incidence. Upon the attainment of a rotational speed preferably considerably higher than the normal rate in autorotational flight, the incidence is increased and preferably also the power to the rotor is cut off. The kinetic energy stored in the rotor then causes the machine to rise generally vertically to effect "direct" take-off.

One of the principal objects of the present invention is the provision of a novel blade mounting for effecting incidence change, particularly suitable for use in accomplishing the direct take-off maneuver.

Another object of this invention is the mounting of the blades for pitch change, as aforesaid, and also for flapping movements, the mounting and pivot parts being so arranged that the axis of the flapping pivot always bears the same relation to the chord line of the blade, in spite of changes in incidence thereof. More specifically, the invention, in effect, provides a movable means for mounting the flapping pivot on the hub.

Still further, the invention has in view the arrangement of the various blade mounting parts in a manner to permit location of the flapping pivot axis very close to the rotational axis of the hub.

The invention also provides a novel control mechanism for variably shifting the blade about its own longitudinal axis in effecting pitch change movements, the said control being positive in action and also structurally arranged in a compact manner.

In accordance with another aspect of the invention, the rotor head further includes means for tilting the rotor hub in order to shift the lift line thereof during flight for control purposes, this tilting means desirably including a gimbal ring; the arrangement further being such that the tilting mounting and control is disposed close to and just below the point of attachment of the blades to the hub, while the control mechanism for pitch change is connected with the blade mounting at the upper side thereof, from which the same is extended centrally downwardly through the hub.

The manner in which the foregoing objects and advantages are achieved will be more apparent from a consideration of the following description referring to the accompanying drawings, in which—

Figure 2 is in part a vertical sectional view and in part an elevation of portions of the mechanism shown in Figure 1, the view being taken substantially as indicated by the section line 2—2 of Figure 1; and Figure 3 is a horizontal view, partly in section, taken as indicated by the section line 3—3 of Figure 1.

Figure 1:
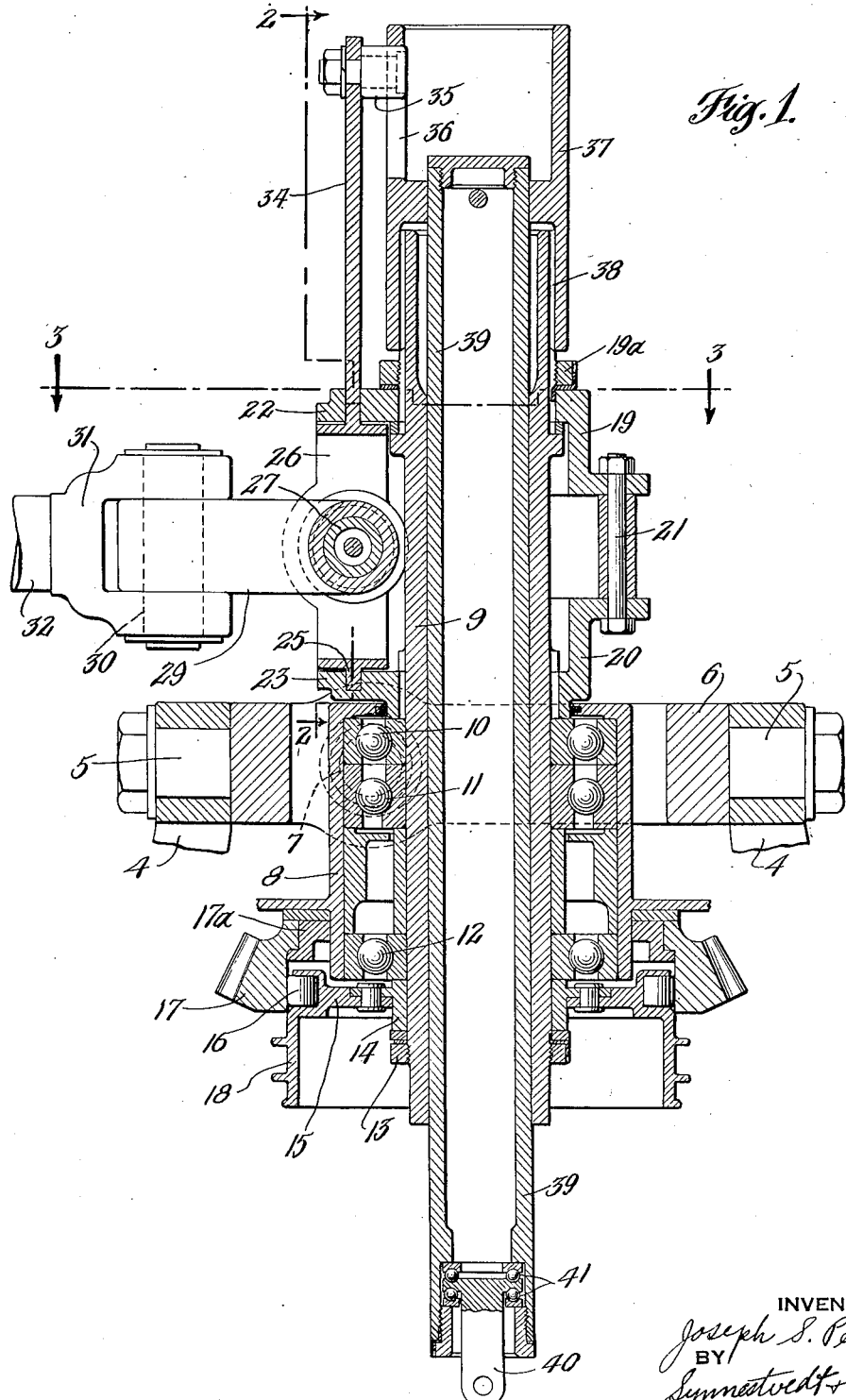
Figure 1 is a vertical sectional view through a rotor head assembly incorporating the improvements of this invention.

In Figure 1, portions of fixed supporting elements for the rotor head are indicated at 4—4. These elements are apertured to receive trunnions 5—5 carried by the gimbal ring 6, the two trunnions being aligned on an axis extended generally fore and aft of the craft so as to provide for tilting of the gimbal ring 6 laterally. The ring 6, in turn, is provided with a pair of trunnions, one of which is indicated at 7, cooperating with the non-rotative hub casing 8 to provide for fore and aft tilting thereof about the axis of the trunnions 7. Thus the hub part 8 and the remaining hub parts carried thereby are mounted for tilting movement in all directions, this for control purposes in the manner disclosed in the copending application of Juan de la Cierva, Serial No. 645,985, filed December 6, 1932.

The hollowed rotative hub spindle 9 is journalled within the hub casing 8 preferably by means of a plurality of bearings 10, 11 and 12. These bearings may be secured in position by means of a threaded ring 13 adjacent the lower end of the spindle 9, which ring also secures collar 14 in place. The collar 14 serves to carry the circular member 15 at the periphery of which a roller or overrunning clutch including rollers 16 is arranged, these rollers being effectively interposed between the circular part 15 and the inner surface of a ring gear 17 employed for the purpose of driving the rotor. Circular part 15 may also be employed to carry the brake drum 18. The ring gear may be journalled on the non-rotative hub part 8 as by means of a bronze bushing or the like 17a. Features of this arrangement are claimed in the application of Harris S. Campbell, Serial No. 119,575, filed January 8, 1937.

In a plane close to but above the plane of the gimbal ring 6, the hub spindle 9 carries fittings 19 and 20 bolted together in spaced relation as shown in Figure 1 at 21, and secured in position on the hub spindle 9 by means of the threaded ring 19a. These fittings have arcuate shoes 22 and 23 (see Figures 1 and 2) which are circumferentially grooved to receive arcuate flanges 24 and 25 formed on the ring 26.

This ring serves to mount the flapping pivot 27 for a blade, needle bearings 28 preferably being interposed between the ring and pivot. The extension link 29 for the blade is apertured to fit the pivot pin 27. Toward its outer end the extension link may also be provided with an aperture to receive a drag articulation 30 cooperating with the fork fitting 31 formed at the root 32 of a blade.

With this arrangement of blade mounting parts, the blade is free to move about the drag articulation and also about the flapping pivot, and in addition about its own longitudinal axis for pitch change, this latter movement being accompanied by movement of the ring 26.

The arcuate member 22 is preferably slotted, as shown at 33 in Figure 2, in alignment with the groove formed in this member for the reception of flange 24 and, for the purpose of effecting and controlling pitch change movements, the ring 26 is equipped with an actuating arm 34 projecting upwardly through the slot 33 and carrying at its upper end a roller 35 engaged in cam slot 36 formed in the sleeve 37. Sleeve 37 in turn is provided with a splined connection 38 with the upper end of the rotative hub spindle 9 so that the sleeve may be moved vertically with respect to the spindle 9 but will always rotate therewith. Vertical movement of the sleeve may be effected by means of the tubular control element 39 connected therewith and extended downwardly to the hollowed hub spindle. At the lower end of the element 39, which rotates with the rotor, there is provided a non-rotative member 40 for the connection of the control, bearings 41 being interposed between the elements 39 and 40.

It will be understood that a suitable flexibly jointed control connection will be attached to the member 40 in order to effect vertical movement thereof, the flexible joint or joints in such connection being necessary because of the tiltable mounting for the hub including the gimbal ring 6 and the trunnions 5 and 7. Vertical movement of the control tube 39 within the hub in turn effects vertical movement of the sleeve 37 and because of the inclination of the cam slot 36, the control arm 34 will be moved in one direction or the other depending upon the movement of the sleeve 37. The arm in turn rotates ring 26 and this causes a change in pitch of the associated blade. It will be understood that the control arm, cam slot, and the like are duplicated for each blade incorporated in the rotor. In this way all blades will be caused to increase or decrease incidence simultaneously and in the same sense.

Preferably, the cam slot 36 and the associated parts are so arranged that downward movement of the sleeve 37, to the position shown in Figures 1 and 2, positions the blade at the normal positive lift flying incidence, for example, about 3 or 4°. In the other position, i. e. with the sleeve 37 raised, the blade is preferably positioned substantially at zero lift incidence. This latter position is employed during driving of the rotor on the ground in preparation for making a direct take-off, and when the rotor attains a speed considerably in excess of the normal autorotational speed in flight, the drive is disconnected and the sleeve 37 drawn downwardly to raise the incidence of the blades and thus effect the take-off. Upon slowing down of the rotor to the normal autorotational speed, the relative air flow of flight takes up and continues rotation of the rotor.

In considering various operational and structural advantages it will be observed that the mechanism for tiltably mounting the rotor is disposed closely adjacent the plane of attachment of the blades to the hub and just below that plane, and that the mechanism for controlling incidence projects in part from the blade mounting thereabove, to be carried downwardly through the hollowed hub spindle.

The structure is also of considerable importance and advantage in maintaining a given relation between the axis of the flapping articulation and the chord line of the blade regardless of the position of adjustment of the incidence control.

Still further, even though the ring 26 mounting the blade for pitch change movements is operatively interposed between the flapping pivot for the blade and the hub, it will be noted that the axis of the flapping pivot is still retained very close to the rotational axis of the hub, this being of importance for several reasons including the fact that such location of the flapping pivot axis "eases" operation of the tilting control for flight maneuvers.

The control connections for changing incidence of the blade, particularly the cam slot and follower elements, are of especial advantage in providing substantial mechanical advantage with very few and simply constructed parts.

I claim:

1. In an aircraft sustaining rotor having a hub and blades, mechanism for mounting a blade on the hub including a ring mounted on the hub for movement substantially about the axis of the blade, a pivot interconnecting the blade and said ring, the pivot axis being extended substantially diametrically of the ring, and an actuating arm connected with said ring and extending therefrom generally axially of the hub.

2. In an aircraft sustaining rotor having a hub and blades, mechanism for mounting a blade on the hub including a ring mounted on the hub for movement substantially about the axis of the blade, and a pivot interconnecting the blade and said ring, the pivot being located substantially in the plane of the ring and having its axis extended substantially diametrically of the ring.

3. In an aircraft sustaining rotor having a hub and blades, mechanism for mounting each blade on the hub including a ring mounted on the hub for movement substantially about the axis of the blade, a pivot interconnecting the blade and said ring, the pivot axis being extended substantially diametrically of the ring, an actuating arm connected with said ring and extending therefrom generally axially of the hub, a control member located centrally of the hub and mounted for axial shifting therein, and a cam-type connection between said member and the actuating arms for the several blades, whereby the pitch of all the blades may be simultaneously altered.

JOSEPH S. PECKER.